United States Patent
Pant et al.

(10) Patent No.: US 7,577,831 B2
(45) Date of Patent: Aug. 18, 2009

(54) RELOCATING OF SYSTEM MANAGEMENT INTERFACE CODE WITHIN AN INFORMATION HANDLING SYSTEM

(75) Inventors: Alok Pant, Cedar Park, TX (US); Anthony L. Overfield, Austin, TX (US); Jim Walker, Austin, TX (US); Kendall C. Witte, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 503 days.

(21) Appl. No.: 11/458,704

(22) Filed: Jul. 20, 2006

(65) Prior Publication Data

US 2008/0022063 A1    Jan. 24, 2008

(51) Int. Cl.
- *G06F 9/00* (2006.01)
- *G06F 13/24* (2006.01)
- *G06F 13/00* (2006.01)
- *G06F 9/26* (2006.01)

(52) U.S. Cl. .......................... 713/1; 710/260; 710/269; 711/165; 711/221

(58) Field of Classification Search ............... 713/1; 710/260, 269; 711/165, 221
See application file for complete search history.

(56) References Cited

U.S. PATENT DOCUMENTS

| 6,178,550 | B1 | 1/2001 | Pearce ............................ 717/9 |
| 6,321,287 | B1 | 11/2001 | Rao et al. .................... 710/260 |
| 6,467,084 | B1 * | 10/2002 | Howard et al. ............... 717/136 |
| 6,564,276 | B1 | 5/2003 | Tyner ......................... 710/260 |
| 2005/0289285 | A1 * | 12/2005 | Taivalsaari et al. ............. 711/1 |
| 2006/0277541 | A1 * | 12/2006 | Sproul et al. ................. 717/174 |
| 2007/0006137 | A1 * | 1/2007 | Savagaonkar et al. ....... 717/106 |

* cited by examiner

*Primary Examiner*—Thuan Du
*Assistant Examiner*—Stefan Stoynov
(74) *Attorney, Agent, or Firm*—Hamilton & Terrile, LLP; Stephen A. Terrile

(57) ABSTRACT

A method for relocating system management interface code in an information handling system which includes extracting a relocation table from the system management interface code, inserting a relocation identifier in each entry of the system management interface code having an address, searching the system management code for the relocation identifier during execution of the information handling system, and inserting an address based upon a relocation address for each entry in the system management interface code having a relocation identifier.

12 Claims, 8 Drawing Sheets

RELOCATING OF SYSTEM MANAGEMENT INTERFACE CODE WITHIN AN INFORMATION HANDLING SYSTEM

BACKGROUND OF THE INVENTION

1. Field of the Invention

The present invention relates to the field of information handling systems, and more particularly to relocating system management interface (SMI) code within an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems with a system management mode (SMM) of operation. Known SMM operating modes include a non-maskable hardware interrupt, specifically a system management interrupt, for invoking a mode independent software routine in a separate SMM address space. Programs running in the SMM mode execute independently of the processor mode and the operating system in a dedicated SMM memory space. Thus, liberating system functions from dependence on the operating system. The SMM code executes in a protected space.

The SMM mode of operation is often access via a system management interface (SMI). In many information handling systems, the SMM code is a major component of the basic input output system (BIOS) of the information handling system. The SMM code is always present and executable, but is accessible only in a special processor mode, SMI mode. The SMI memory is often hidden even from the operating system of the information handling system.

There are at least two known methods for hiding the SMI memory, a high segment (HSEG) method and a top segment (TSEG). With the HSEG method, the SMI code is copied to and executed from a fixed address region (e.g., hex address 0xfeda0000). Because this address is fixed, the SMI code can be built knowing it will start at this address. The HSEG method limits the size of the SMI code.

With the TSEG method, the SMI code resides at the top of installed memory. Not all machines have the same amount of memory installed. Therefore, the starting address of the SMI code is not known at build time. For simplicity, the SMI code uses a 32 bit flat memory model. This means the SMI code includes absolute references to locations within the SMI code. When the base address of the SMI code is determined during power on self test (POST), these references are adjusted relative to the base address. This adjustment is referred to as relocation.

One possible solution to the need for relocation is to use a virtual memory mechanism (such as a code segment selector) to relocate the SMI code. This method introduces the possibility of subtle errors in the code as, e.g., a reference to a table or location in the code segment may be inadvertently accessed as a data location. The SMI code is sufficiently complex and dynamic that such errors may occur. Simplicity is the reason for using a 32-bit flat model.

With another known solution a relocation table is added to the SMI code in the ROM. Every location to be adjusted by the physical address is a 32-bit location (a dword). The target of the relocation is a location within the SMI code (or, in the future, the SMI data). Each relocation entry includes the location to be patched. The relocation table is a list of these entries. After the SMI code is copied from ROM to RAM (at the "top" of the installed memory), the loading code walks through the relocation table to patch SMI code locations based on the physical address of the SMI base. This method is very similar to many static relocation systems; i.e., the 'link' phase of compilation. FIG. 1, labeled prior art, shows an example of how a portion of this solution would be implemented.

The relocation table can consume over 1K bytes of ROM. Relocating the SMI data segment (in known systems, the data segment of the SMI code is fixed at a physical address (e.g., hex address 0xe0000)) can make this relocation table even larger.

SUMMARY OF THE INVENTION

In accordance with the present invention, a method for relocating system management interface code by embedding relocation entries within the SMI code where the relocations entries are identified by a signature pattern is set forth.

The relocation information can be embedded in the executable code because the SMI code executes with a 32-bit flat address space, so every location to be adjusted is 32-bits wide. Every location to be adjusted refers to another location in the executable code. The code expects to start at address 0. If the code size is limited to 256 KB, this pointer is at most 18-bits wide. Therefore, (with a 256 KB code size limit) 14-bits are available to store a signature pattern value.

For example if the SMI code is 256 KB, the offset of the referenced location (which appears in the dword to be relocated) is at most 18 bits. The other 14 bits of this dword are left as 0. As a final step in the build process, a build program traverses through the relocation table to place a signature pattern in the upper 14 bits of each location that needs to be relocated. Once these signatures are embedded in the SMI code, the relocation table is discarded.

During a power on self test operation (POST), while copying the SMI code from ROM to RAM, an SMI code loader looks for a signature pattern in the more significant 14 bits of every dword. If this signature is found, the signature is cleared and the dword is relocated relative to an SMI code base address.

In one embodiment to address the possibility that the signature pattern appears in the SMI code not as a relocation marker, a table of signature pattern exceptions is appended to the SMI code.

With this relocation method, the overhead for each location to be relocated is 0 bytes. The total overhead depends on the number of times the signature pattern appears in the code. This is minimized by scanning the SMI code to specify the signature pattern as the 14 bit pattern that appears least frequently at the top of a dword. With a 256 KB code block, there is a 14-bit pattern that appears less than 17 times. So the total overhead is at most 64 bytes. More typically, the overhead will be zero bytes.

By embedding the relocation entries in the SMI code, the need for a relocation table is eliminated and thus ROM corresponding to the size of the relocation table is recovered.

In one embodiment, the invention relates to a method for relocating system management interface code in an information handling system which includes extracting a relocation table from the system management interface code, inserting a relocation identifier in each entry of the system management interface code having an address, searching the system management code for the relocation identifier during execution of the information handling system, and inserting an address based upon a relocation address for each entry in the system management interface code having a relocation identifier.

In another embodiment, the invention relates to an apparatus for relocating system management interface code in an information handling system. The apparatus includes means for extracting a relocation table from the system management interface code, means for inserting a relocation identifier in each entry of the system management interface code having an address, means for searching the system management code for the relocation identifier during execution of the information handling system, and means for inserting an address based upon a relocation address for each entry in the system management interface code having a relocation identifier.

In another embodiment, the invention relates to an information handling system which includes a processor and memory coupled to the processor. The memory stores a relocation system for relocating system management interface code. The relocation system includes instructions for extracting a relocation table from the system management interface code, inserting a relocation identifier in each entry of the system management interface code having an address, searching the system management code for the relocation identifier during execution of the information handling system, and inserting an address based upon a relocation address for each entry in the system management interface code having a relocation identifier.

In another embodiment, the invention relates to a method for relocating code, which is much smaller than virtual memory space, in a virtual memory space of an information handling system. The method includes extracting a relocation table from the code, inserting a relocation identifier in each entry of the code having an address, searching the code for the relocation identifier during execution of the information handling system, and inserting an address based upon a relocation address for each entry in the code having a relocation identifier.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
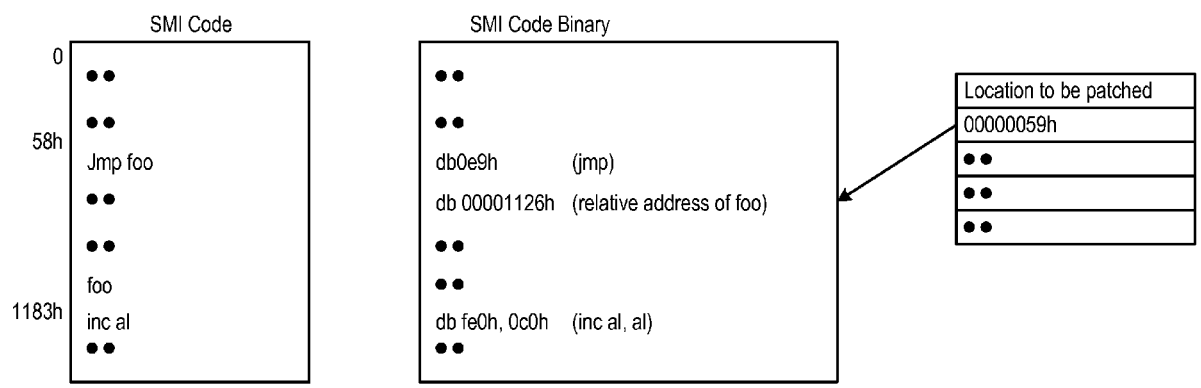
FIG. 1, labeled prior art, shows a block diagram of a portion of SMI code which includes a relocation table.
Figure 2:
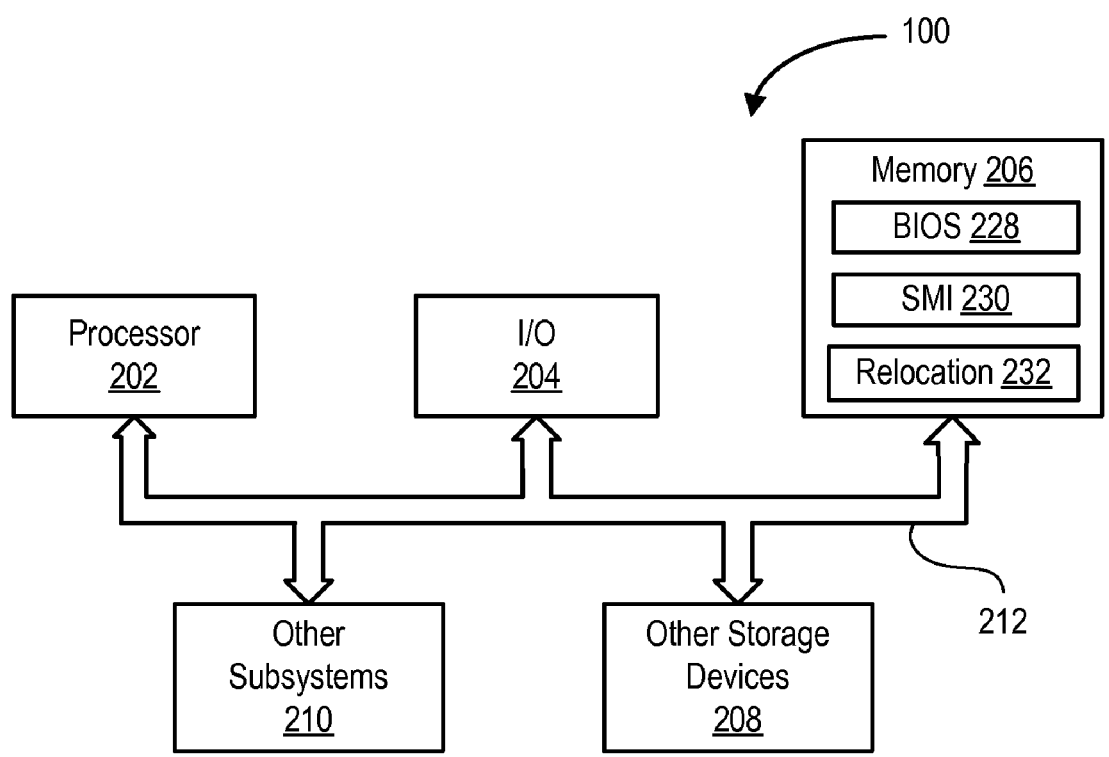
FIG. 2 shows a block diagram of an information handling system.

Referring briefly to FIG. 2, a system block diagram of an information handling system 200 is shown. The information handling system 200 includes a processor 202, input/output (I/O) devices 204, such as a display, a keyboard, a mouse, and associated controllers, memory 206, including volatile memory such as random access memory (RAM) and non-volatile memory such as read only memory (ROM) and hard disk drives, and other storage devices 208, such as a floppy disk and drive or CD-ROM disk and drive, and various other subsystems 210, all interconnected via one or more buses 212. The memory 206 includes a basic input output system 228 as well as SMI code 230. The memory also includes a relocation system 232.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
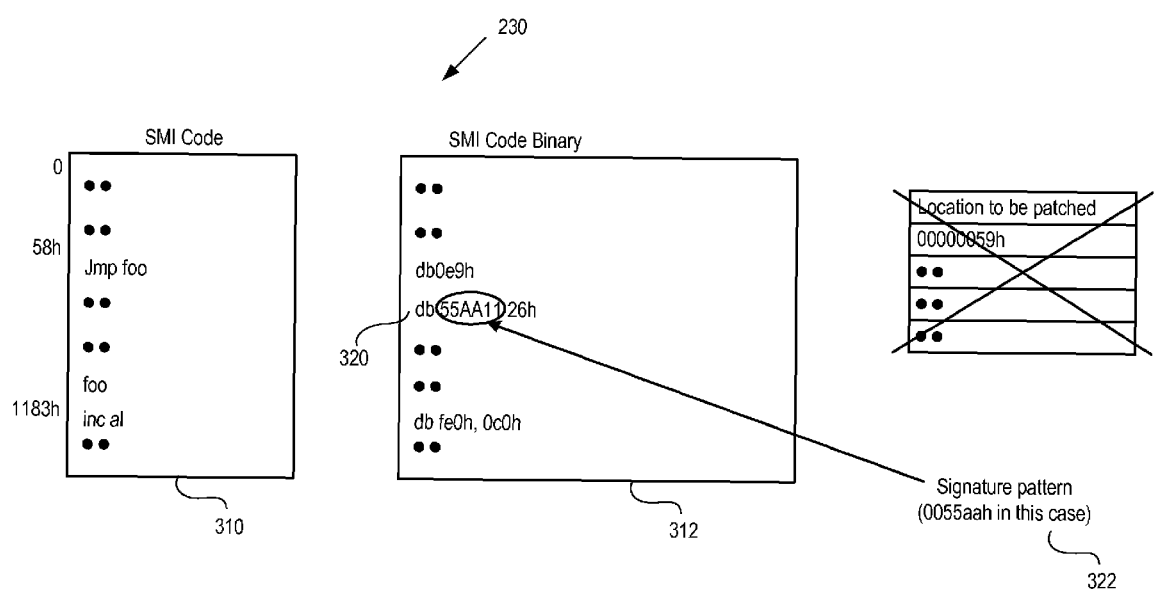
FIG. 3 shows a block diagram of SMI code which uses the relocation method of the present invention.

Referring to FIG. 3, a block diagram of SMI code which uses the relocation method is shown. More specifically, the SMI code 230 includes SMI assembly code 310 and SMI binary code 312. The SMI binary code includes embedded relocation entries 230. The relocation entries 320 are identified by a signature pattern 322. For example if the SMI code is 256 KB, the offset of the referenced location (which appears in the dword to be relocated) is at most 18 bits. The other 14 bits of this dword are left as 0. As a final step in the build process, a build program traverses through the relocation table to place a signature pattern in the upper 14 bits of each location that needs to be relocated. Once these signatures are embedded in the SMI code, the relocation table is discarded.

During the initialization of the information handling system, such as during a power on self test operation (POST), when the SMI code is copied from read only memory to random access memory, the relocation system 232 reviews the SMI code for a signature pattern 322 (e.g., in the more significant 14 bits of every dword). If this signature is found, the signature is cleared and the dword is relocated relative to an SMI code base address.

The relocation information can be embedded in the executable code because the SMI code executes with a 32-bit flat address space, so every location to be adjusted is 32-bits wide. Every location to be adjusted refers to another location in the executable code. The SMI code expects to start at address 0. If the SMI code size is limited to 256 KB, this pointer is at most 18-bits wide. Therefore, (with a 256 KB code size limit) 14-bits are available to store a signature pattern value.

Figure 4:
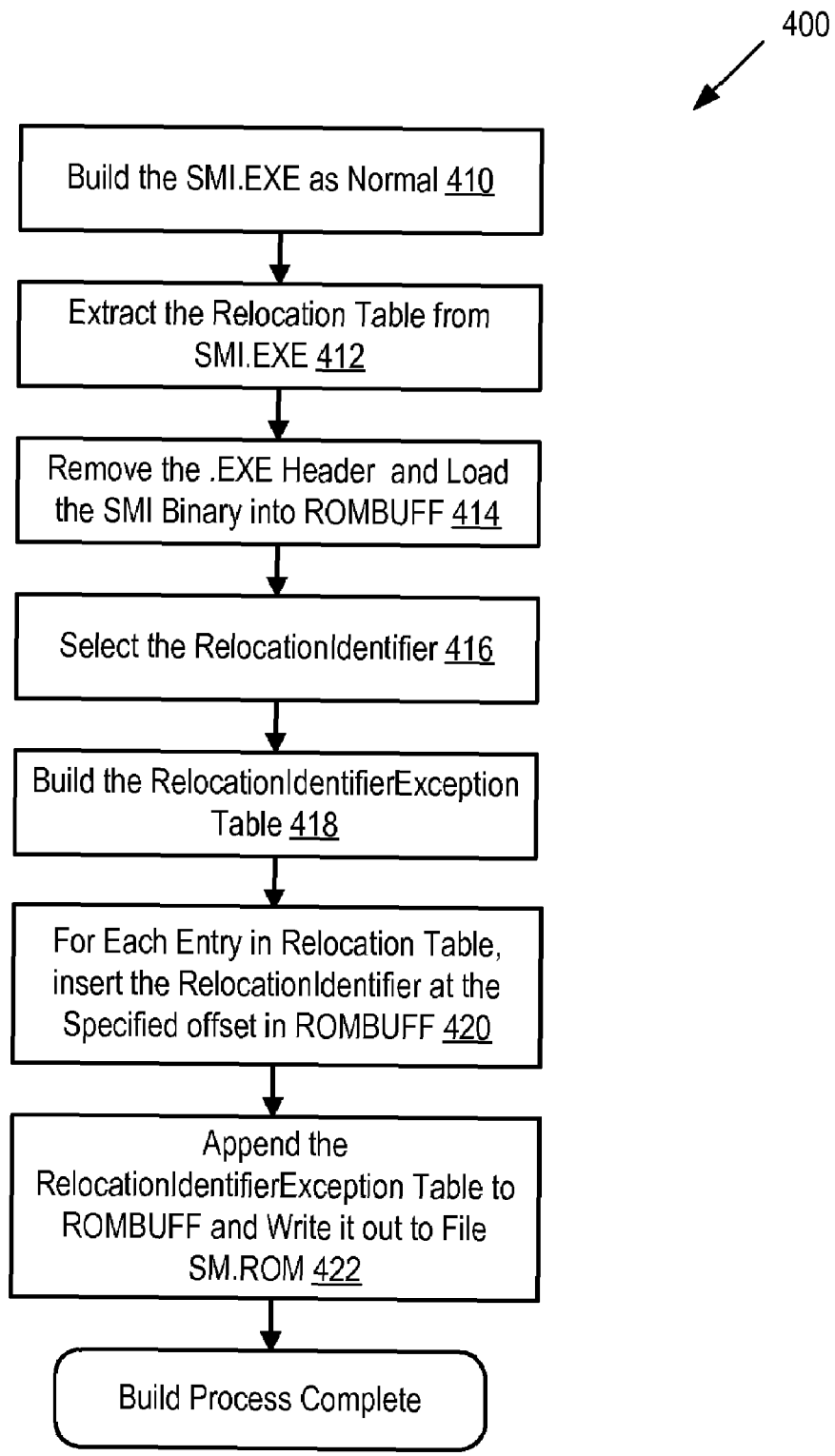
FIG. 4 shows a flow chart of the operation of the relocation build system.

FIG. 4 shows a flow chart of the operation of a relocation build system 400. During the build process, the relocation build system 400 traverses the relocation table to place a signature pattern in each location that needs to be relocated. Once these signatures are embedded in the SMI code, the relocation table is discarded.

More specifically, the relocation build system 400 begins operation by building the SMI binary code 322 (e.g., SMI.EXE) at step 410. Next, the relocation table is extracted from the SMI binary code 322 at step 412. Next, the .EXE header is removed and the SMI binary code 322 is loaded into a read only memory buffer (ROMBUFF) at step 414. Next, the relocation system 400 selects a relocation identifier (RelocationIdentifier) at step 416. The RelocationIdentifier is the signature pattern that is embedded in the SMI image to mark dwords that need to be relocated. Next the relocation system 400 builds a relocation identifier exception (RelocationIdentifierException) table. The RelocationIdentifierException table is the table that tracks all instances where the signature pattern appears in the SMI Image not as a relocation marker. Next, at step 420 for each entry in the relocation table the relocation identifier is inserted into the instruction corresponding to the specified offset. Next, the relocation identifier exception table is appended to the SMI binary code within the ROM buffer and the resulting file is stored as a new file (SM.ROM) at step 422 and the build process completes.

Figure 5:
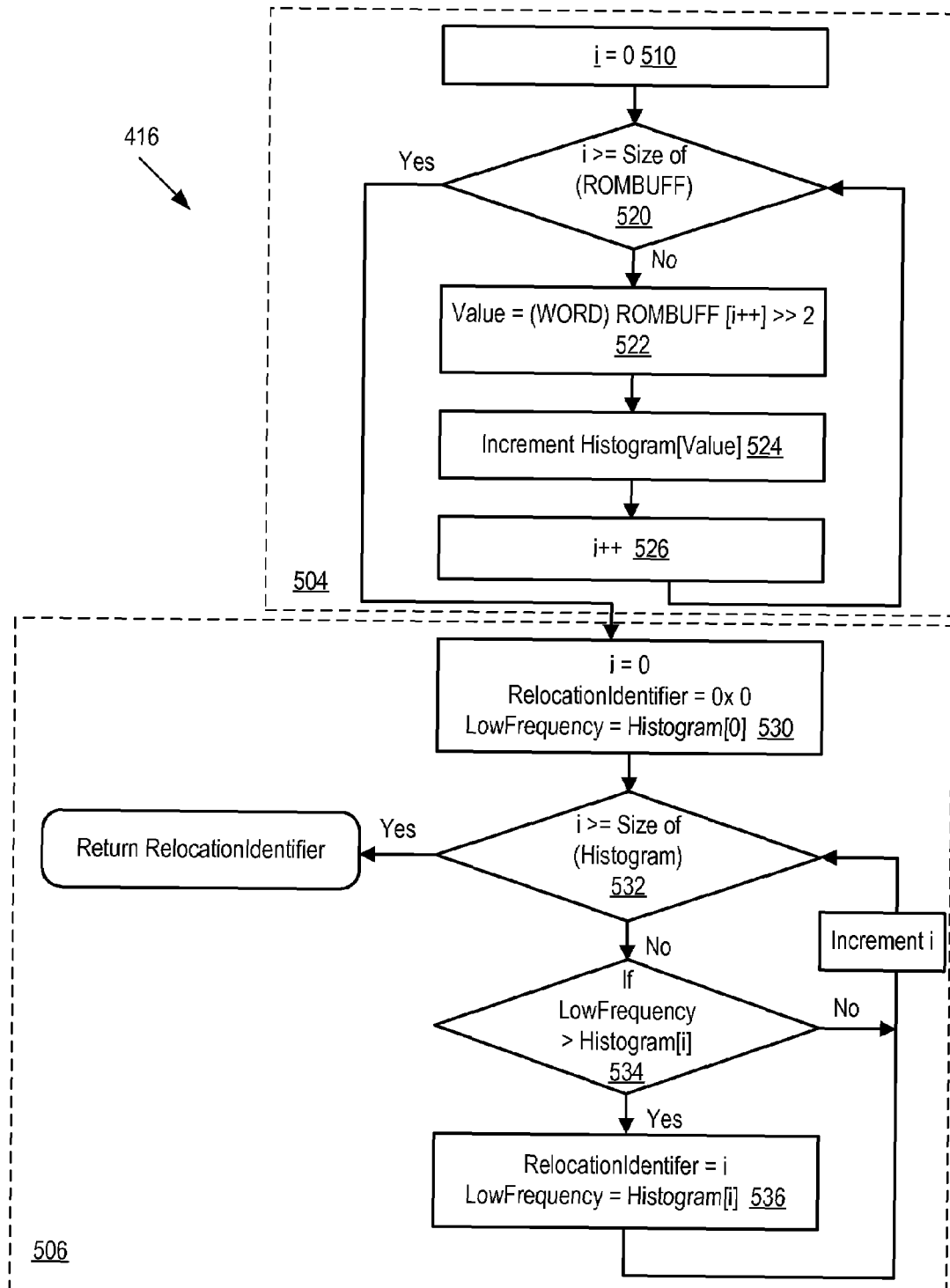
FIG. 5 shows a flow chart of the operation of the relocation build system when selecting a relocation identifier.

FIG. 5 shows a flow chart of the operation of the relocation build system when selecting a relocation identifier. With the relocation system, the overhead for each location to be relocated is zero bytes. The total overhead depends on the number of times the signature pattern appears in the SMI code. Accordingly, the number of times that the signature pattern appears is minimized by scanning the code to specify the signature pattern that appears least frequently at the top of a dword. With a 256 KB code block, there is some 14-bit pattern that appears less than 17 times. So the total overhead is at most 64 bytes. If a signature pattern does not appear at all, then the overhead associated with the relocation system will be 0 bytes. The module for selecting a relocation identifier includes a histogram portion 504 and a lowest value portion 506. The histogram portion 504 builds a histogram that shows the frequency of each value that appears in the more significant bits of every word within the SMI code. The lowest value portion 506 selects the lowest value from the histogram to be used as the relocation identifier.

More specifically, the histogram portion 504 of the module for selecting a relocation identifier 416 starts by initializing a counter to zero at step 510. A histogram is built to show the frequency of each value (e.g., a 14-bit value) that appears in the more significant bits (e.g., the 14 more significant bits) of every word within the ROM buffer. Accordingly, the counter is reviewed to determine whether the counter is greater or equal to the size of the value stored within the ROM buffer at step 512. Next the value being analyzed is set to the word value of in the ROM buffer at step 522. Next the value of the histogram is incremented at step 524 and the counter value is incremented at step 526. After each value of the SMI code is stored into the histogram, as indicated by the value of the counter being larger than the size of the SMI code stored within the ROM buffer, the histogram portion completes operation and the lowest value portion 506 starts execution.

During the execution of the lowest value portion 506, the counter is set to zero, the relocation identifier is set to zero and the low frequency value is set equal to the first histogram location at step 530. Next at step 532, the counter is checked to determine whether all values within the histogram have been analyzed. If so, then the value corresponding to the low frequency value is set at the relocation identifier. If not, then the low frequency value is compared to the value within entry in the histogram at step 534. If the low frequency value is greater than the value in the entry of histogram at the location identifier by the counter, then the relocation identifier is set to the value of the counter and the low frequency value is set to the count within the histogram at step 536, the counter is incremented at step 538 and the counter is again compared to the overall size of the histogram at step 532. If the low frequency value is not greater than the value in the entry of the histogram, then the counter is incremented at step 538 and the counter is again compared to the overall size of the histogram at step 532.

Figure 6:
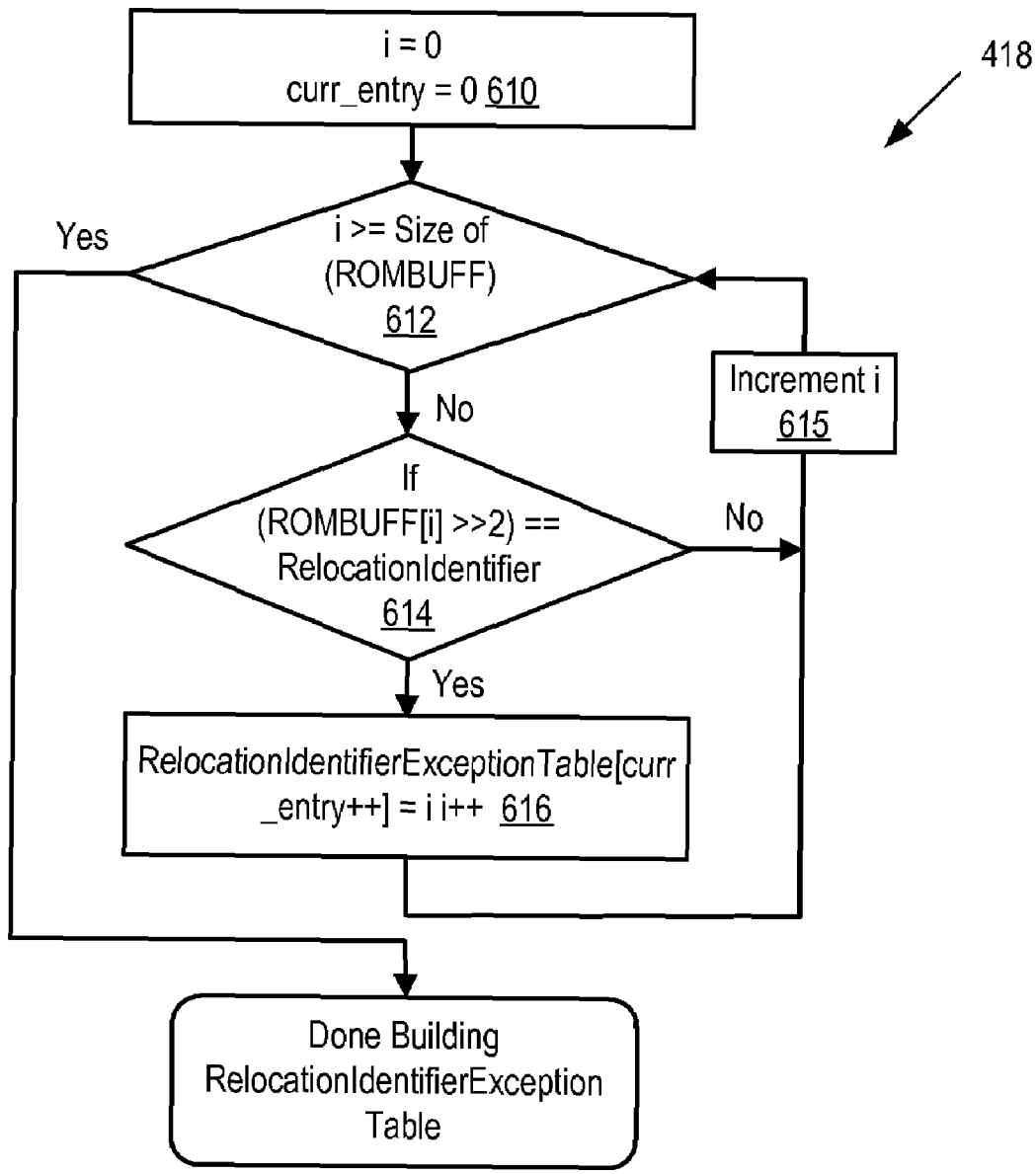
FIG. 6 shows a flow chart of the operation of the relocation build system when building a relocation identifier exception table.

FIG. 6 shows a flow chart of the operation of a module 418 for building a relocation identifier exception table. To address the possibility that the signature pattern appears in the SMI code not as a relocation marker, a table of signature pattern exceptions is generated and appended to the SMI code.

More specifically, the building of a relocation identifier exception table starts by setting a counter to zero and a current entry (curr_entry) to zero at step 610. Next the counter is analyzed to determine whether the entire ROM buffer contents have been reviewed at step 612. If the entire contents have been reviewed, then the process completes.

If the entire contents of the ROM buffer have not been reviewed, then the next entry of the ROM buffer is compared to the relocation identifier to determine whether there is a match at step 614. If there is no match, then the counter is incremented at step 615 and then the counter is again analyzed to determine whether the entire ROM buffer contents have been reviewed at step 612. If there is a match, then the entry in the ROM buffer corresponding to the relocation identifier is added to the relocation identifier exception table at step 616 and the counter is incremented at step 615.

Figure 7:
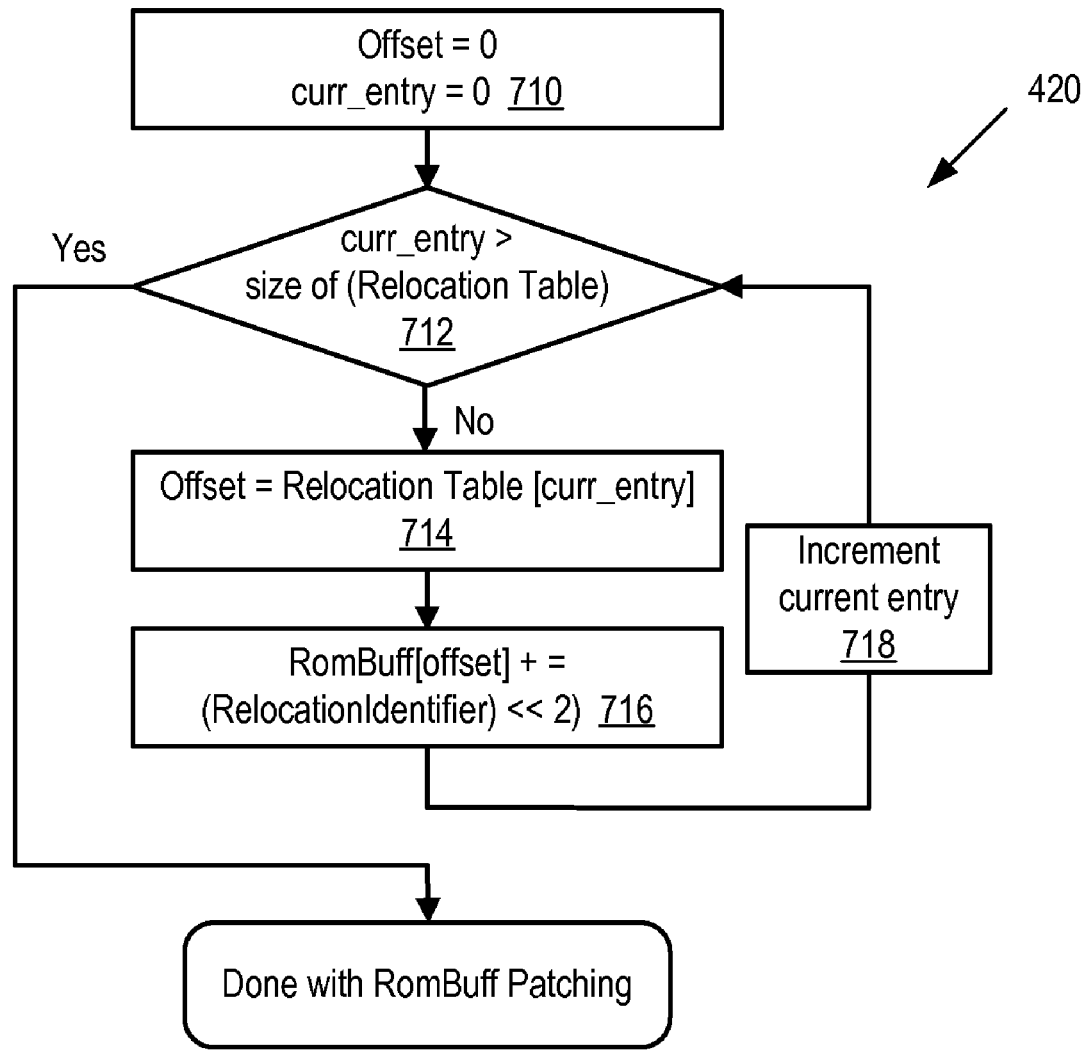
FIG. 7 shows a flow chart of the operation of the relocation build system when patching the SMI code with the relocation identifier.

FIG. 7 shows a flow chart of the operation of a module 420 for patching the SMI code with the relocation identifier. The module 420 inserts the relocation identifier into every location within the SMI.ROM code that is to be adjusted with a final SMI destination address at run time.

More specifically, patching of the SMI code with the relocation identifier starts by setting an offset value to zero and a current entry to zero at step 710. Next the current entry is reviewed to determine whether the current entry is greater than the size of the relocation table at step 712. If so, then the processing of the SMI code is complete.

If the current entry is not greater than the size of the relocation table, then the offset is set equal to the value of the current entry of the relocation table at step 714. Next the ROM buffer offset set to equal the value of the next entry which includes a relocation identifier at step 716, the current entry is incremented at step 718 and the processing returns to step 712.

Figure 8:
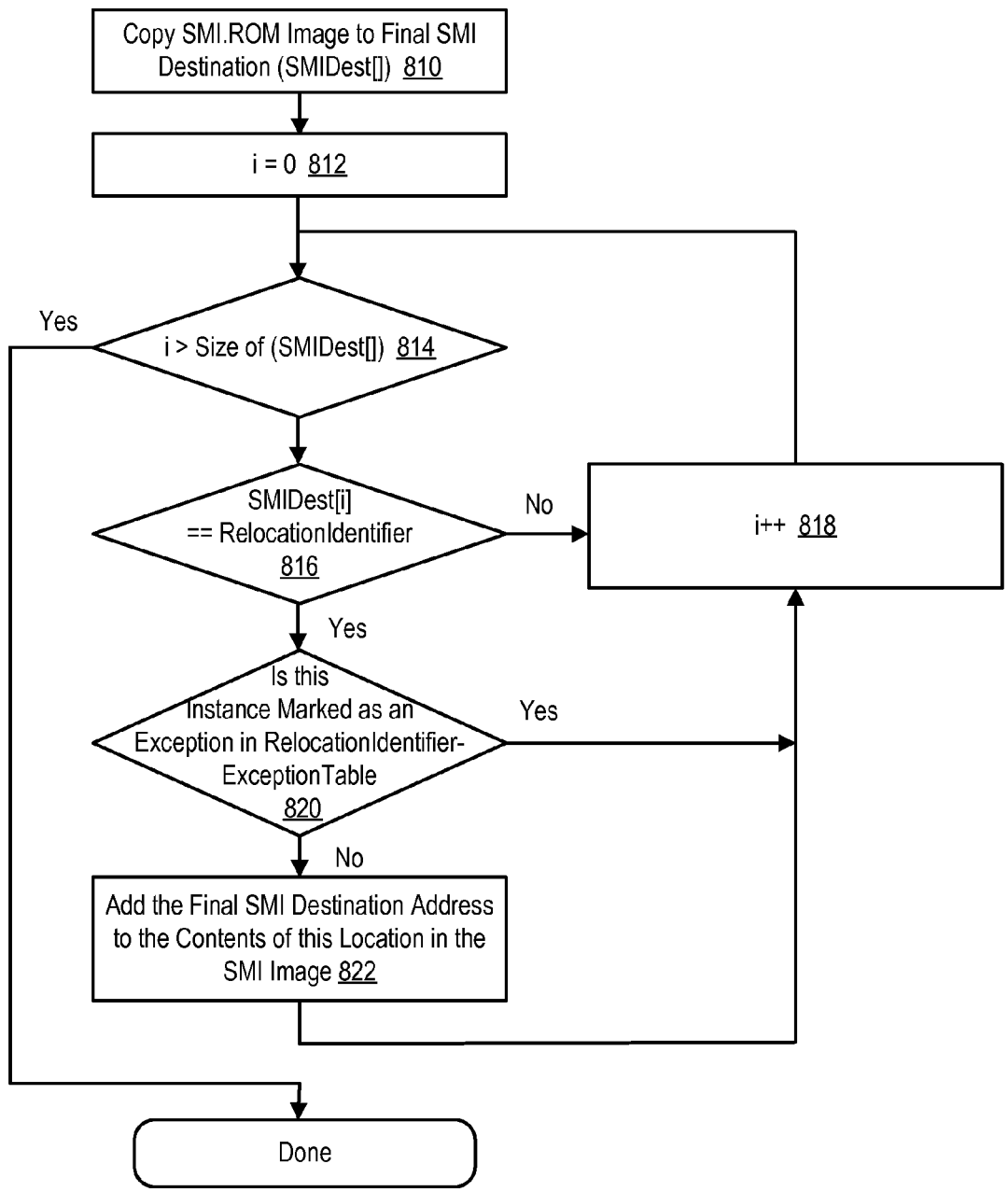
FIG. 8 shows a flow chart of the operation of the relocation system during operation of the information handling system.

FIG. 8 shows a flow chart of the operation of the relocation system during operation of the information handling system (i.e., during run time). More specifically, the SMI.ROM image is copied to the final destination for the SMI code (SMIDEST[ ]) at step 810. Next the counter is set to zero at step 812. Next the counter is analyzed to determine whether the counter value has exceeded the size of the SMI code at step 814. If the counter is greater than the size of the SMI code, then the execution of the relocation system 232 completes. If the counter is not greater than the size of the SMI code, then the entry corresponding to the counter is analyzed to determine whether the entry includes a relocation identifier at step 816. If not, then the counter is incremented to the next entry at step 818 and the counter is again checked to determine whether all of the SMI code has been processed at step 814.

If the SMI entry includes the relocation identifier, then the exception table is checked to determine whether the instance having the relocation identifier is contained within the exception table at step 820. If the entry is contained within the exception table, then the counter is incremented to the next entry at step 818. If the entry is not contained within the exception table, then the final SMI destination address is added to the contents of this location in the SMI image at step 822 and the counter is incremented at step 818.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example as well as large scale data bases or data warehouses. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Also for example, while the present invention is describe with reference to system management interface code, the method is also applicable to code which is much smaller than the virtual memory space (i.e., the code is less than 20 percent of the overall size of the virtual memory space) in which the code is located when the code is relocated within the virtual memory space.

Also for example, while it is memory space that is conserved by the present invention. This method is applicable to code that is downloaded, in which case the savings may be the transmission time required to download the code as no relocation tables are needed within the downloaded code.

Consequently, the invention is intended to be limited only by the spirit and scope of the appended claims, giving full cognizance to equivalents in all respects.

What is claimed is:

1. A method for relocating system management interface code in an information handling system comprising:
    extracting a relocation table from the system management interface code;
    inserting a relocation identifier in each entry of the system management interface code having an address;
    searching the system management code for the relocation identifier during execution of the information handling system;
    inserting an address based upon a relocation address for each entry in the system management interface code having a relocation identifier;
    generating exception information for entries of the system management interface code containing information corresponding to the relocation identifier where the entries are not entries needing relocation;
    scanning entries of the system management interface code to determine a sequence of bits occurring least frequently within the entries of the system management interface code; and,
    using a least frequently occurring sequence of bits for the relocation identifier.

2. The method of claim 1 further comprising:
    appending an exception table to the system management interface code based upon the exception information.

3. The method of claim 1 further comprising:
    removing the relocation table from the system management interface code after inserting the relocation identifier for each entry of the system management interface code.

4. An apparatus for relocating system management interface code in an information handling system, the apparatus comprising:
    means for extracting a relocation table from the system management interface code;
    means for inserting a relocation identifier in each entry of the system management interface code having an address;
    means for searching the system management code for the relocation identifier during execution of the information handling system;
    means for inserting an address based upon a relocation address for each entry in the system management interface code having a relocation identifier;
    means for generating exception information for entries of the system management interface code containing information corresponding to the relocation identifier where the entries are not entries needing relocation;
    means for scanning entries of the system management interface code to determine a sequence of bits occurring least frequently within the entries of the system management interface code; and,
    means for using a least frequently occurring sequence of bits for the relocation identifier.

5. The apparatus of claim 4 further comprising:
    means for appending an exception table to the system management interface code based upon the exception information.

6. The apparatus of claim 4 further comprising:
means for removing the relocation table from the system management interface code after inserting the relocation identifier for each entry of the system management interface code.

7. An information handling system comprising:
a processor;
memory coupled to the processor, the memory storing a relocation system for relocating system management interface code, the relocation system including instructions for
extracting a relocation table from the system management interface code;
inserting a relocation identifier in each entry of the system management interface code having an address;
searching the system management code for the relocation identifier during execution of the information handling system;
inserting an address based upon a relocation address for each entry in the system management interface code having a relocation identifier;
generating exception information for entries of the system management interface code containing information corresponding to the relocation identifier where the entries are not entries needing relocation;
scanning entries of the system management interface code to determine a sequence of bits occurring least frequently within the entries of the system management interface code; and,
using a least frequently occurring sequence of bits for the relocation identifier.

8. The information handling system of claim 6 wherein the relocation system further includes instructions for:
appending an exception table to the system management interface code based upon the exception information.

9. The information handling system of claim 6 wherein the relocation system further includes instructions for:
removing the relocation table from the system management interface code after inserting the relocation identifier for each entry of the system management interface code.

10. A method for relocating code in a virtual memory space of an information handling system, the code being much smaller than the virtual memory space, the method comprising:
extracting a relocation table from the code;
inserting a relocation identifier in each entry of the code having an address;
searching the code for the relocation identifier during execution of the information handling system;
inserting an address based upon a relocation address for each entry in the code having a relocation identifier;
generating exception information for entries of the code containing information corresponding to the relocation identifier where the entries are not entries needing relocation;
scanning entries of the code to determine a sequence of bits occurring least frequently within the entries of the management interface code; and,
using a least frequently occurring sequence of bits for the relocation identifier.

11. The method of claim 10 further comprising:
appending an exception table to the code based upon the exception information.

12. The method of claim 10 further comprising:
removing the relocation table from the code after inserting the relocation identifier for each entry of the code.

* * * * *

UNITED STATES PATENT AND TRADEMARK OFFICE
CERTIFICATE OF CORRECTION

PATENT NO. : 7,577,831 B2 Page 1 of 1
APPLICATION NO. : 11/458704
DATED : August 18, 2009
INVENTOR(S) : Pant et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 532 days.

Signed and Sealed this

Seventh Day of September, 2010

David J. Kappos
*Director of the United States Patent and Trademark Office*